United States Patent [19]
Maruno et al.

[11] Patent Number: 5,917,264
[45] Date of Patent: Jun. 29, 1999

[54] ELECTROSTATIC CAPACITANCE TYPE TRANSDUCER AND METHOD FOR PRODUCING THE SAME

[76] Inventors: Naohiko Maruno; Seiichi Yokoyama; Hiroji Ito; Fumio Kaise; Yukimitsu Sekimori, all of Tokyo, Japan

[21] Appl. No.: 08/922,507

[22] Filed: Sep. 3, 1997

[30] Foreign Application Priority Data

Sep. 5, 1996 [JP] Japan .................................. 8-235387
Dec. 5, 1996 [JP] Japan .................................. 8-325385

[51] Int. Cl.⁶ ........................................... G01L 1/14
[52] U.S. Cl. .......................... 310/309; 73/718; 73/724; 361/283; 361/284
[58] Field of Search ................. 310/309; 73/718, 73/724, 514.32; 361/283, 284

[56] References Cited

U.S. PATENT DOCUMENTS

| | | | |
|---|---|---|---|
| 4,384,899 | 5/1983 | Myers | 148/1.5 |
| 4,527,428 | 7/1985 | Shimada et al. | 73/721 |
| 4,996,627 | 2/1991 | Zias et al. | 361/283 |
| 5,186,054 | 2/1993 | Sekimura | 73/724 |
| 5,189,916 | 3/1993 | Mizumoto et al. | 73/724 |
| 5,201,228 | 4/1993 | Kojima et al. | 73/724 |
| 5,343,756 | 9/1994 | Nakamura et al. | 73/718 |
| 5,400,489 | 3/1995 | Hegner et al. | 29/25.41 |
| 5,421,213 | 6/1995 | Okada | 73/862.043 |
| 5,561,247 | 10/1996 | Mutoh et al. | 73/724 |
| 5,571,970 | 11/1996 | Mutoh et al. | 73/724 |
| 5,636,100 | 6/1997 | Zheng | 361/212 |
| 5,676,851 | 10/1997 | Suzuki et al. | 216/2 |

FOREIGN PATENT DOCUMENTS

| | | | |
|---|---|---|---|
| 42 34 969 | 4/1993 | Germany | 310/309 |
| 63-110670 | 5/1988 | Japan | H01L 29/84 |
| 2-290524 | 11/1990 | Japan | G01L 9/04 |

*Primary Examiner*—Thomas M. Dougherty

[57] ABSTRACT

The present invention provides an electrostatic capacitance type transducer and a method for producing the same, with the ensured sufficient connecting strength and insulation between a movable electrode and a fixed electrode and smooth production. In the electrostatic capacitance type transducer having: a substrate; a movable electrode placed on the opposite side of a space from the substrate and having displacement in relation to the substrate; and a fixed electrode formed on a detecting face of the substrate which is opposite to the movable electrode, an insulation film is formed on the approximately whole surface, including the fixed electrode, of the detecting face of the substrate, in which the substrate and the movable electrode are connected through the insulation film to each other by means of the anode-contact.

9 Claims, 8 Drawing Sheets

ELECTROSTATIC CAPACITANCE TYPE
TRANSDUCER AND METHOD FOR
PRODUCING THE SAME

BACKGROUND OF THE INVENTION

1. Field of the Invention

This invention relates to an electrostatic capacitance type transducer and a method for producing the same, which is used for a pressure sensor, an acceleration sensor, and so on.

2. Description of the Related Art

Electrostatic capacitance type transducer An electrostatic capacitance type transducer has conventionally used for a measuring instrument, such as a pressure sensor and an acceleration sensor. The electrostatic capacitance type transducer has a structure that a movable electrode and a substrate, having a film-shaped fixed electrode facing toward the movable electrode, are opposed to each other to make a space between them, in which the displacement of the movable electrode with relation to the substrate is detected as a change of electric capacitance between the movable electrode and the fixed electrode.

For example, in an electrostatic capacitance type pressure sensor, a diaphragm as the movable electrode, made of silicon having conductivity, is placed to oppose to the substrate through the space, in which the substrate has the fixed electrode on a detecting face facing toward the diaphragm. When pressure of fluid is measured, the fluid measured is guided onto a face of the diaphragm which does not face toward the substrate. The pressure of the fluid is changed into an electric signal by detecting the displacement of the diaphragm, caused by the pressure of the fluid, as a change of electrostatic capacitance.

For the precise measurement by using the electrostatic capacitance type transducer such as the pressure sensor as described above, insulation between the movable electrode and the fixed electrode is required. But, when the transducer is in a humid atmosphere, water in the ambient air touches the electrode or the substrate and insulation resistance can be decreased. As insurance against the insulation resistance, an insulating skin is formed on the surface of the fixed electrode or the movable electrode by partially coating resin, glass or the like in order that water does not directly touch the fixed electrode or the movable electrode.

In producing the electrostatic capacitance type transducer, a voltage of approximately 400 V is applied to the glass substrate and the silicon movable electrode under high temperatures of approximately 400° C. to connect the substrate to the movable electrode directly, in other words, by anodic bonding.

Anodic-Bonding

However, the connecting strength when the substrate and the movable electrode are mutually connected by means of anodic bonding is inferior, and it leads to decrease of yield rate.

More specifically, cleanliness of both faces of the members which are mutually connected is a big factor for the connecting strength in the anodic bond. But, the fixed electrode of the electrostatic capacitance type transducer is made of metal material that differs from materials, such as glass, of the substrate, hence constraints of a cleaning fluid and a cleaning manner as compared with the use of the same material. Moreover, cleaning is complicated by throughholes formed on the substrate for receiving an output from the fixed electrode, or the like. Therefore the connecting faces of the substrate and the movable electrode are not sufficiently cleaned.

It is difficult to clean organic matter at the molecular level which midbonds to the substrate even with an organic solvent. A thermal strong sulfuric acid or an alkali solution stronger than an organic solvent cannot be used of the fixed electrode and the substrate for reasons of damage. A clean by using dry-etching, ozone or plasma facilitates adsorption of water molecular onto the surface of the substrate, thus decreasing insulation resistance of the substrate.

Accordingly, trace contaminants of the organic matter on the surface of the substrate connected are not completely cleaned. There is frequently decrease of contact yield rate which is suspected to be traceable to the contaminants on the connecting face.

Concerning a semiconductor pressure sensor, a method, in which a ceramic insulation film as a top coat is formed on a face of a diaphragm, facing toward a substrate, and the diaphragm and the substrate are mutually connected through the insulation film by means of the anodic bond, is proposed (Japanese Patent laid-open No. Sho63-110670).

It is considered with the application of the above method to the electrostatic capacitance type transducer that the decrease of insulation resistance between the electrodes can be avoided by forming an insulation film on the movable electrode and connecting the movable electrode and the substrate through the insulation film by means of the anodic bond. But, in the above method, although insulation between the movable electrode and the fixed electrode is retained, insulation resistance between the fixed electrodes cannot be avoided when the plural fixed electrodes are formed on the substrate. For the aforementioned reasons, the cleanliness of the substrate cannot be enhanced, so that the sufficient connecting strength cannot be obtained. Therefore, the decrease of contact yield rate remains.

In order to partially form the insulating skin on the surface of the substrate for enhancing the insulation, the insulation film should undergo partial patterning through photolithography or the like, resulting in the complicated processes for producing. Furthermore, in many cases, the substrate and the insulating skin are a glass substance to be formed as an insulator. The glass substance dissolves in an etching fluid, resulting in the confused determination of the end of etching.

Miniaturization

The conventional electrostatic capacitance type transducer is relatively large in size, so that abnormal skew of the movable electrode presents no disadvantage even in anodic bonding since a spaced range between the movable electrode and the substrate is large. However, the spaced range between the movable electrode and the substrate is smaller by miniaturizing the pressure sensor or the like. Therefore, strong electrostatic attraction is created between the movable electrode and the fixed electrode when a high voltage is applied during anodic bonding. The movable electrode is drawn toward the substrate and skewed or touched to the substrate. Where anodic bonding is continued during the above state, the movable is formed not in an even state but in a skewed state toward the substrate. And, harmful stress is given to the movable electrode, with the result that the movable electrode does not have the displacement in response to the pressure or the like.

The U.S. Pat. No. 4,384,899 and Japanese Patent Laidopen No. Hei2-290524 are known as technology for resolving the disadvantages described thus far. In the above methods, a high voltage is applied to the fixed electrode formed on the substrate to equalize a potential of the fixed electrode to a potential of the movable electrode, thereby preventing generation of electrostatic attraction.

Some pressure sensors have the plural fixed electrodes on the substrate, such as a central electrode positioned the center and a peripheral electrode surrounding the central electrode. In the above pressure sensor, the pressure can be further accurately detected by measuring a difference of electrostatic capacitance on each fixed electrode.

The above pressure sensor has been deliberated about the prevention of the touch or abnormal skew of the movable electrode, as explained above, by equalizing potentials of the central electrode and the peripheral electrode to a potential of the movable electrode. For this requirement, a voltage can be applied to the central electrode and the peripheral electrode by using signal receiving portions, formed on the surface (the reverse of the surface formed with the central electrode and the peripheral electrode) of the substrate, to be extended from each electrode.

With the miniaturization of the pressure sensor, the size of the signal receiving portion is extremely smaller, and further, a space between each signal receiving portion and an electrode for anodic bonding, surrounding the signal receiving portions, is shorter. Therefore, it is difficult that a terminal for voltage application is directly connected to each signal receiving portion as disclosed in the U.S. Pat. No. 4,384,899. Therefore, a leading portion extended from each signal receiving portion is formed outside the anodic bonding electrode, and the application should be carried out by connecting a conductor wire to the leading portion.

Figure 9:
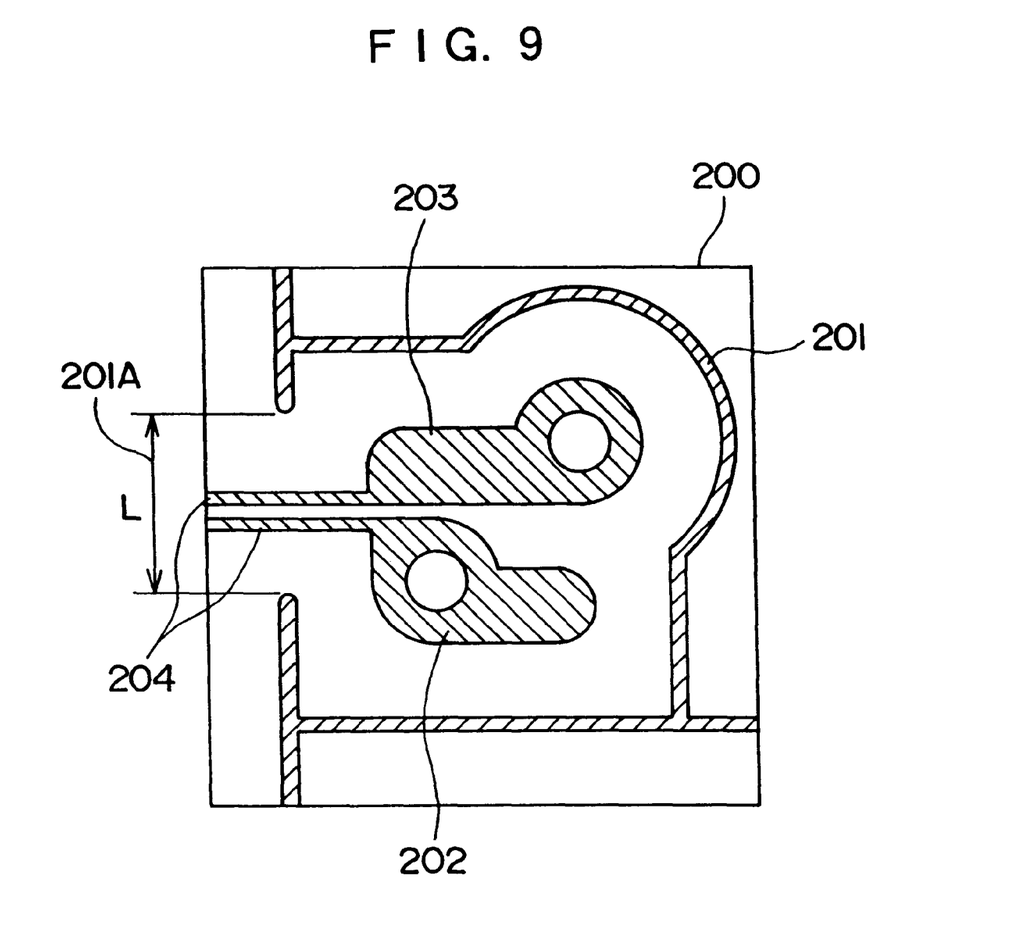
FIG. 9 is a plane view showing a conventional pressure sensor.

However, as shown in FIG. 9, in a chip-shaped pressure sensor 200, in order to extend each leading portion 204 of signal receiving portions 202 and 203 outside an anodic bonding electrode 201, each leading portion 204 is needed to be pass through a discontinuous portion 201A of the anodic bonding electrode 201. Where the number of the leading portions 204 is two for the central electrode and the peripheral electrode, the length L of the discontinuous portion 201A is longer, thus the inferior connecting strength between the movable electrode and the substrate. And further, for example, where more than three signal receiving portions and the leading portions for each signal receiving portion are formed, the implementation of the anodic bonding itself is difficult.

On the other hand, when the plural leading portions are passed through the short discontinuous portion, the leading portion approaches the anodic bonding electrode, thereby allowing a disadvantage for a withstand voltage against the high voltage applied during anodic bonding.

As a result, when the plural fixed electrodes are formed on the substrate, the leading portion approaches the anodic bonding electrode, thereby allowing a disadvantage for a withstand voltage against a high voltage applied during anodic bonding.

As a result, when the plural fixed electrodes are formed on the substrate made of glass or the like, there is a limitation of increasing the connecting strength between the substrate and the movable electrode while maintaining the sufficient withstand voltage.

OBJECTS OF THE INVENTION

It is an object of the present invention to provide an electrostatic capacitance type transducer and a method for simply producing the same, in which insulation between a movable electrode and a fixed electrode can be ensured and the sufficient connecting strength can be obtained.

It is another object of the present invention to provide an electrostatic capacitance type transducer and a method for producing the same, in which the connecting strength between a substrate and a diaphragm can be increased and the diaphragm is prevented from being drawn toward the substrate during anodic bonding.

SUMMARY OF THE INVENTION
Transducer

The present invention relates to an electrostatic capacitance type transducer having a substrate, a movable electrode placed on the opposite side of a space from the substrate and having displacement in relation to the substrate, and a fixed electrode formed on a detecting face of the substrate which is opposite to the movable electrode, in which the substrate and the movable electrode are connected to each other by means of an anodic bonding, it being characterized by including an insulation film which is formed on the approximately whole surface, including the fixed electrode, of the detecting face of the substrate, in which the substrate and the movable electrode are connected through the insulation film to each other by means of anodic bonding.

In this invention, the insulation film is formed on the detecting face of the substrate, so that a clean face of the insulation film is formed on the face, connected to the movable electrode, of the substrate which has difficulty in being cleaned. After forming the insulation film, the movable electrode and the substrate are mutually connected through the insulation film by means of anode bonding. Therefore, the decrease of the connecting strength which is caused by contaminants in the substrate can be avoided, resulting in the sufficient connecting strength.

The anodic bonding occurs close to the movement of ions which is caused by an electric field, so that it is considered that the film quality and the contacting state to the substrate of the intermediate insulation film are involved in the connecting strength between the substrate and the movable electrode. According to this invention, the insulation film is formed on the substrate having the fixed electrode. When the substrate is heated in forming the insulation film, the surface of the substrate is cleaned by the heat. Thereby enhancing the contactual strength of the insulation film and stabilizing the film quality.

Therefore, the diffusional movement of ions is smoothly carried out in anodic bonding by forming the insulation film on the substrate having the fixed electrode, resulting in the improved connectivity between the substrate and the movable electrode.

Where the insulation film is formed by a plasma CVD (Chemical Vapor Deposition) or sputtering, the surface of the substrate is bombarded by electrons or the like, thereby obtaining a high degree of cleaning effectiveness. Water molecules are easily absorbed onto the surface of the substrate and then the insulation resistance must be decreased. However, insulation can be ensured by forming the insulation film, so that the connecting strength between the substrate and the movable electrode can be enhanced without decrease of the insulation resistance of the substrate.

The insulation film is formed on the approximately whole surface, including the fixed electrode, of the detecting face of the substrate, so that the insulation film is not needed to be carried out the partial patterning, thereby simplifying the processes for forming the film and easily fabricating the film.

The sufficient insulation between the fixed electrode and the movable electrode can be obtained by coating the detecting face of the substrate, including the fixed electrode, with the insulation film. And further, even in the case of using plural fixed electrodes, decrease of the insulation resistance between the fixed electrodes can be certainly avoided. Thus ensuring the stable and accurate output in high humidity.

The accurate detection is impossible when the surface of the fixed electrode is changed by the corrosion of the fixed electrode and a spaced range between the fixed electrode and the movable electrode changes. According to the present invention, the corrosion resistance of the fixed electrode is improved by coating the fixed electrode with the insulation film. Therefore the spaced range between the fixed electrode and the movable electrode is maintained in normal, so that the accurate detection can be obtained.

It is advisable that the insulation film has a thickness ranging from 100 Å to 10,000 Å, preferably, approximately 2,000 Å. Where the thickness of the insulation film is less than 100 Å, functions as a protective film can be inferior. Where the thickness of the insulation film exceeds 10,000 Å, it is difficult for ions to move, and the connectivity can be inferior.

As the materials of the insulation film, a compound that the main component is silicon dioxide ($SiO_2$), such as various types of glasses, resins and ceramics and so on, can be used. Here, various types of glasses includes glass containing a metallic oxide, a metal-nitride-oxide, a metallic carbide, boron (B) or phosphorus (P).

The preferable main component is the silicon dioxide ($SiO_2$) in the above materials for the insulation film from the viewpoint of the sufficient corrosion resistance and the connectivity to the substrate. Here, silicon dioxide ($SiO_2$) as the main component means a state that the amount of silicon dioxide ($SiO_2$) is among the largest in the all components of the insulation film. More specifically, silicon dioxide ($SiO_2$) is inescapably the main component when the a silicon dioxide content exceeds 51% of the component. For example, although a silicon dioxide content is 30%, silicon dioxide is the main component when each content of other components is less than 30%. But, in order to make the most of silicon dioxide causing the improvement in the corrosion resistance and adherence, it is advisable that a silicon dioxide content is more than 90% from viewpoint of practicality.

Signal receiving portion

In the description thus far, it is advisable that: the at least first and second fixed electrodes are formed on the substrate and at least one of the fixed electrodes is formed to surround other fixed electrodes; the substrate has signal receiving portions, conducted to the fixed electrodes on the substrate, and an anodic bonding electrode, surrounding the signal receiving portions and having a discontinuous portion locally; and one of the signal receiving portions, that is conducted to the first or second fixed electrode, has a leading portion extended to the outside of the anodic bonding electrode via the discontinuous portion of the anodic bonding electrode.

It is desired that either the first or second fixed electrode is fixed electrodes which surround other fixed electrodes, for example, it can be the outermost fixed electrode.

When only one signal receiving portion of the plural signal receiving portions has the leading potion, the length of the discontinuous portion of the anodic bonding electrode can be defined as a length allowing only one leading portion to pass, in which the length may be short even with consideration given to maintain a sufficiently withstand voltage. As a result, the connecting strength between the substrate and the movable electrode in the anodic bonding can be large even when plural fixed electrodes are formed on the substrate.

The leading portion is conducted to the outermost fixed electrode of the fixed electrodes that surround other fixed electrodes formed on the substrate. For this reason, when the voltage of the same volt as that of the movable electrode is applied to the leading portion before carrying out the anodic bonding, other fixed electrodes which are surrounded with the above fixed electrode have the approximately equalized electric potential to the movable electrode, with the result that the movable electrode is not drawn toward the substrate.

There is the suggestion that the length of the discontinuous portion is shortened by forming the leading portion only in the central electrode. But, according to the suggestion, the perimeter of the peripheral electrode is in the contact electric potential, so that the electric potential of the peripheral electrode approaches the electric potential of the contact electrode as the main electric potential of the substrate. As a result, the movable electrode is still drawn, hence it is advisable to use the outermost fixed electrode for forming the leading portion.

In the above description, the electrostatic capacitance type transducer can be fabricated by the following method: forming a laminated wafer by connecting a substrate wafer, combinedly formed with the plural substrates, and a movable electrode wafer, combinedly formed with the plural movable electrodes by means of the anodic bonding; and cutting plural sensor chips formed on the laminated wafer into individual pieces, in which the laminated wafer may has a series of conducting portions, conducted to the leading portions of the sensor chips and formed on cutting lines for the laminated wafer.

At this point, the leading portions are conducted through the conducting portions to one another. In order to allow the fixed electrodes on the substrate to have the approximately equalized electric potential to the movable electrode when anodic bonding is performed, a voltage is applied to, for example, one place where the conducting portions are extended. Plural sensor chips are simultaneously formed to be combinedly arranged on the laminated wafer, and then are cut into each sensor chip. Thereby, the anodic bonding can be carried out with simple facilities even when the miniaturized electrostatic capacitance type transducers are produced in quantity.

The conducting portions are formed on the cutting lines, so that the unnecessary conductors are not on the electrostatic capacitance type transducers after the cutting process. For the obvious reason, for example, it is avoided that the conductor wires make a short circuit through the unnecessary conductors when each signal receiving portion undergoes bonding.

When the substrate is an insulator, the side face of the substrate may be formed thereon with a signal receiving portion for movable electrode which is conducted to the movable electrode.

Here, the electrode for movable electrode is not needed to be exposed by cutting a part of the substrate or by another way as disclosed in Japanese Patent Laid-open No. Hei2-290524. Therefore, the signal receiving portion of the movable electrode is easily formed even in the miniaturized electrostatic capacitance transducer, thereby further enhancing miniaturization of the pressure sensor.

Producing method

The present invention is also a method for producing an electrostatic capacitance type transducer having a substrate, a movable electrode placed on the opposite side of a space from the substrate and having displacement in relation to the substrate, and a fixed electrode formed on a detecting face of the substrate which is opposite to the movable electrode, wherein the substrate and the movable electrode are connected to each other by means of anodic bonding, it is characterized by including the steps of: forming an insulation film on the approximately whole surface, including the fixed electrode, of the detecting face of the substrate; and connecting the substrate and the movable electrode through the insulation film by means of the anodic bonding.

In this invention, the connecting strength between the substrate and movable electrode is enhanced, moreover, the sufficient accuracy of detection is obtained by forming the insulation film as described above. The process for forming the film can be simplified by forming the insulation film on the approximate whole detecting surface of the substrate. Signal receiving portion in the processes It is advisable that: at least the first and second fixed electrodes are formed on the substrate and at least one of the fixed electrodes is formed to surround other fixed electrodes; the substrate has signal receiving portions, conducted to the fixed electrodes on the substrate, and an anodic bonding electrode, surrounding the signal receiving portions; and electric potentials of the movable electrode and the first or second fixed electrode are equalized to each other when the substrate and the movable electrode are connected by means of anodic bonding.

It is desired that the first or second fixed electrode is one of the fixed electrodes which surround other fixed electrodes, for example, it can be the outermost fixed electrode.

With the above structure, all the electrodes formed on the opposite face of the substrate have the approximately equalized electric potential to the electrode of the movable electrode as described above, thereby preventing the movable electrode from being abnormally skewed toward the substrate, for example.

The electrostatic capacitance type transducer can be produced by the steps of: forming a laminated wafer by connecting a substrate wafer, combinedly formed with the plural substrates, and a movable electrode wafer, combinedly formed with the plural movable electrodes by means of anodic bonding; cutting plural sensor chips formed on the laminated wafer into individually; holding the cut sensor chips into a holding jig having plural chip holders at predetermined intervals; exposing at least parts of each sensor chip, conducted to the movable electrode, and the side face of the substrate from the holding jig; placing a cover, having a cut-out portion, on the mutually adjacent sensor chips to allow the cut-out portion to position opposite to the mutually proximate parts of the sensor chips during the exposing step; and supplying by evaporating an evaporation material, having conductivity, toward the cut-out portion opposite to the mutually proximate parts to form a signal receiving portion for movable electrode, spreading across the parts conducted to the movable electrode and the side face of the substrate.

In this case, miniaturization of the pressure sensor is further enhanced as described above.

Furthermore, the signal receiving portions are simultaneously formed for plural sensor chips, hence the efficient production of the pressure sensor. The holding jig and the cover are simply structured by only providing the holder and the cut-out portion, so that the manufacturing is easy at small cost. As a result, the production costs of the pressure sensor are reduced.

DETAILED DESCRIPTION OF THE PREFERRED EMBODIMENT(S)

Figure 1:
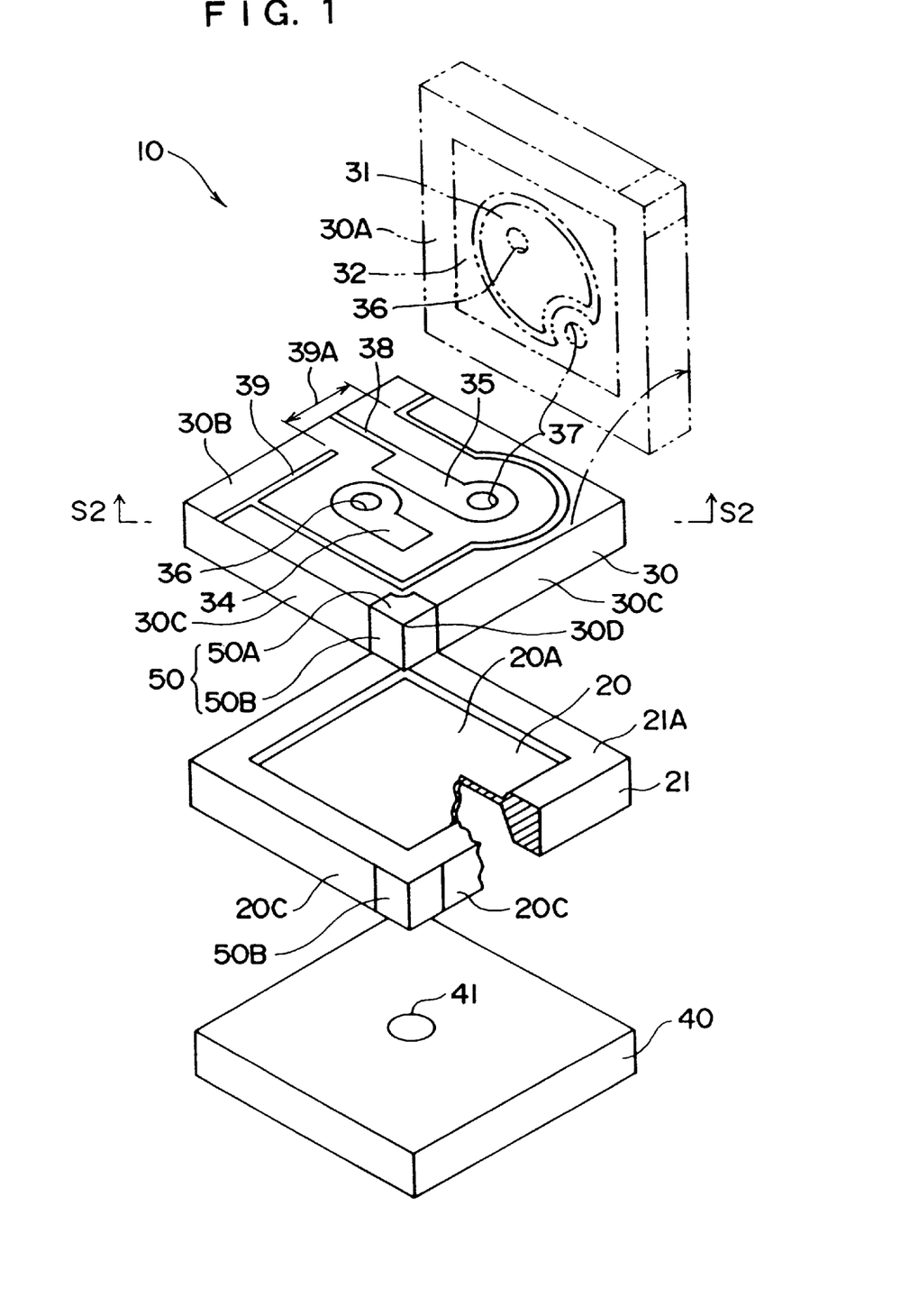
FIG. 1 is a perspectively exploded view showing the preferred embodiment according to the present invention.
Figure 2:
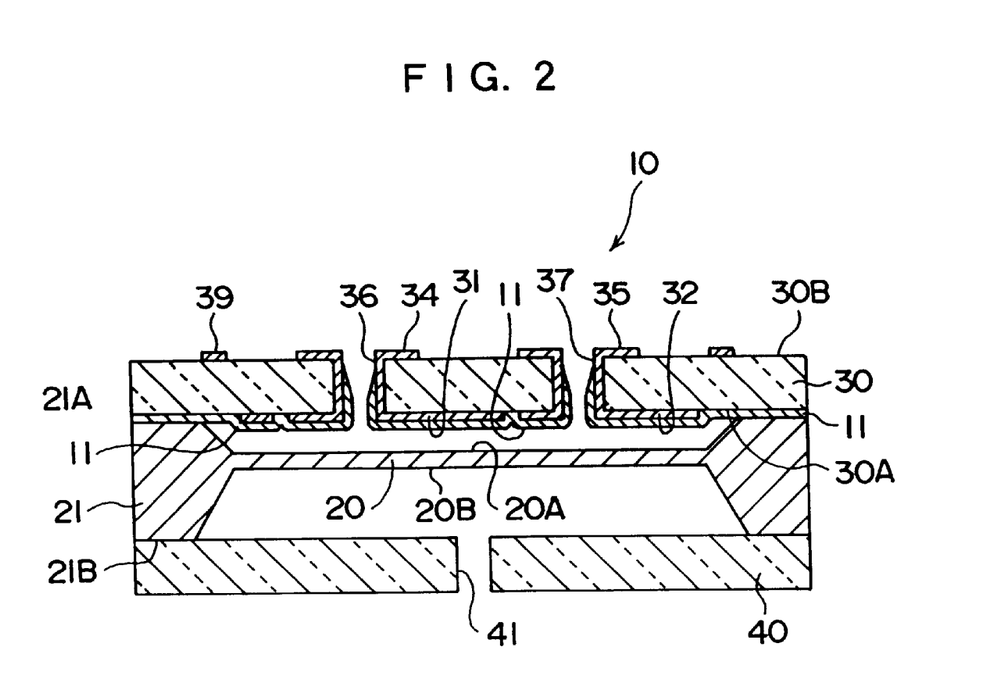
FIG. 2 is a sectional view taken along the S2—S2 line in each of FIG. 1 and FIG. 4.

The preferred embodiment will be described below with reference to the attached drawings.
Pressure sensor FIG. 1 and FIG. 2 show a pressure sensor 10 as an electrostatic capacitance type transducer. The pressure sensor 10 is an electrostatic capacitance type pressure sensor that detects pressure as changes of electrostatic capacitance. The pressure sensor 10 is composed of a diaphragm 20 capable of elastically deforming as a movable electrode, and a upper glass 30 and a lower glass 40 which are connected to a thicker portion 21 formed on the margins of the diaphragm 20 by means of anodic bonding, and sandwich the diaphragm 20.

Predetermined spaces are formed inside the center than the thicker portion 21 between the diaphragm 20 and the upper and the lower glasses 30 and 40, respectively. The elastic deformation of the diaphragm 20 in the spaces causes the displacement of the diaphragm 20 in relation to the upper glass 30 as a substrate.

The diaphragm 20 is made of silicon having conductivity, such as single-crystal silicon, which the diaphragm 20 itself is an electrode. In the aforementioned diaphragm 20, an opposite face 20A facing toward the upper glass 30 is placed on a lower-lying area than the position of an upper face 21A of the thicker portion 21. An opposite face 20B facing toward the lower glass 40 (see FIG. 2) is placed on a higher-lying area in the drawing (on a lower-lying area, looked from the lower glass 40) than the position of a lower face 21B of the thicker portion 21. The differences between the faces 20A and 20B and the upper and lower glasses 30 and 40, explained above, are formed by etching through a photoresist process and the like from the state that the diaphragm 20 is, for example, silicon approximately 0.1 mm thick.

The height of the above difference is not limited, but the difference between the opposite face 20A and the upper face 21A of the thicker portion 21 is, for example, approximately 2 $\mu$m to 8 $\mu$m. The difference between the opposite face 20B and the lower face 21B is, for example, approximately 80 $\mu$m.

Figure 3:
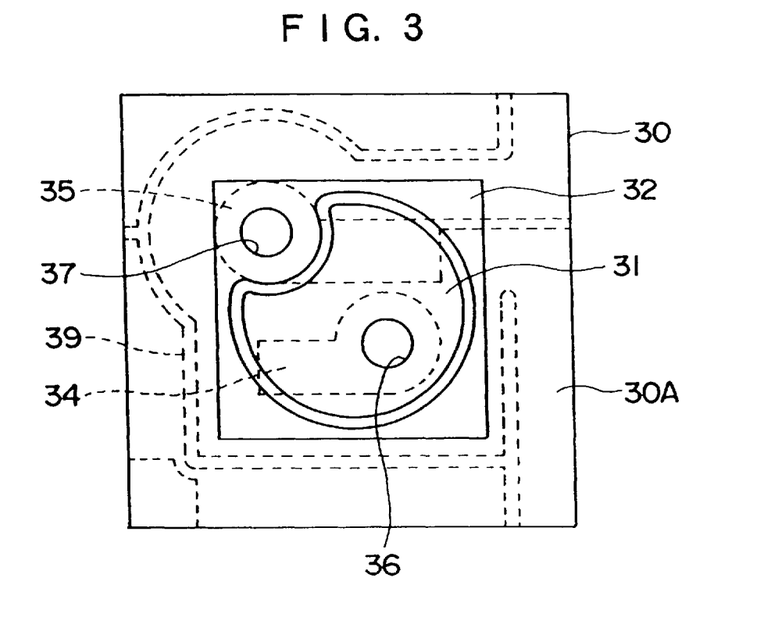
FIG. 3 is a back view of a substrate of the embodiment in the absence of an insulation film.
Figure 4:
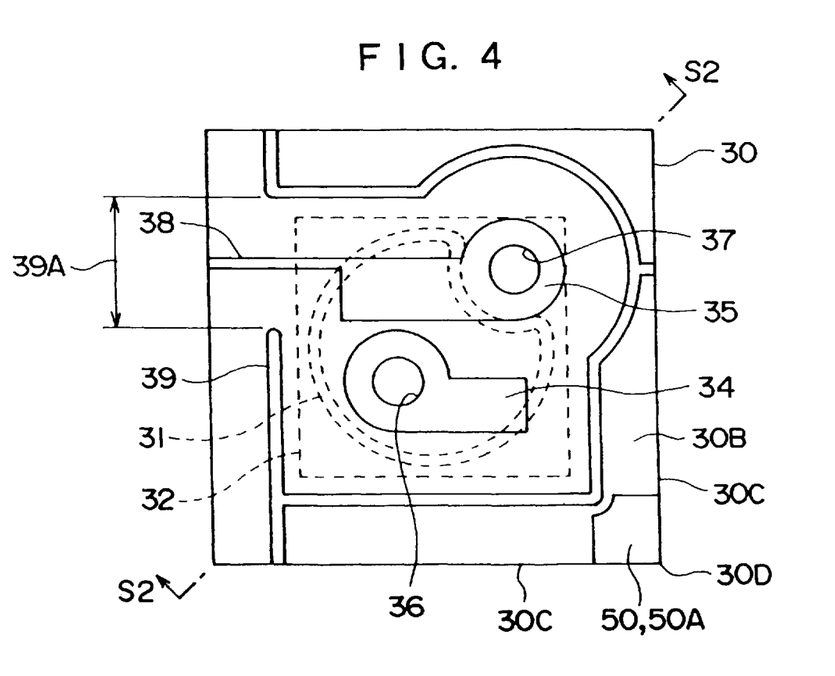
FIG. 4 is a plane view of the reverse surface of the substrate shown in FIG. 3.

As shown in FIG. 3, the upper glass 30 is a substrate in the present invention, in which a detecting face 30A facing toward the diaphragm 20 has a film-shaped central electrode 31 as a fixed electrode and a film-shaped peripheral electrode 32 as a fixed electrode surrounding the central electrode 31. As shown in FIG. 4, the electrodes 31 and 32 are respectively conducted through through-holes 36 and 37 to signal receiving portions 34 and 35 that are formed on an upper face 30B (the reverse face of the detecting face 30A) of the upper glass 30. Only the signal receiving portion 35, connected to the peripheral electrode 32, of the signal receiving portions 34 and 35 has a leading portion 38 which is extended to the end of the upper glass 30. The electrodes 31 and 32, the signal receiving portions 34 and 35, and the leading portion 38 are made of metal having conductivity, such as aluminum.

As shown in FIG. 1 and FIG. 4, an anodic bonding electrode 39 used in the anodic bonding is formed on the upper face 30B of the upper glass 30, which has a configuration roughly corresponding to the edges of the diaphragm 20 and surrounds the signal receiving portions 34 and 35. The leading portion 38 is extended through a discontinuous portion 39A, gas defined by the anodic bonding electrode 39.

A signal receiving portion 50 is formed on a corner 30D of the upper glass 30 to be extended from a side face 20C of the diaphragm 20. The signal receiving portion 50 is formed to continue an upper face 50A formed on the upper face of the upper glass 30, and a side face 50B that is formed to spread across the side face 20C of the diaphragm 20 and a side face 30C of the upper glass 30.

Turning to FIG. 2, an insulation film 11 made from silicon dioxide ($SiO_2$) is formed on an approximately all area, including the central electrode 31 and the peripheral electrode 32, of a detecting face 30A of the upper glass 30. The insulation film 11 has a thickness ranging from 100 Å to 10,000 Å, for example, approximately 2,000 Å. The insulation film 11 reaches the edges of the upper glass 30 that is contacted to the diaphragm 20, in which the upper glass 30 and the diaphragm 20 are connected through the insulation film 11 to each other by the anodic bonding.

The lower glass 40 has a pressure guiding port 41 at the approximate center, in which pressure measured is applied from the pressure guiding port 41.

Incidentally, the lower glass 40 can be properly omitted by taking into account the using manner of the pressure sensor.

In the aforementioned pressure sensor 10, when pressure is applied into the pressure guiding port 41, the diaphragm 20 makes elastic deformation to be curved. Thereby changing the spaced ranges between the diaphragm 20 and each of the central electrode 31 and the peripheral electrode 32 on the upper glass 30. Then the electrostatic capacitance is changed in response to the changed spaced range, thereby measuring the pressure. The displacement of the diaphragm 20 is large around the center and small around the periphery, so that a value of the electrostatic capacitance, which is generated between the diaphragm 20 and the central electrode 31 of the upper glass 30, differs from that between the diaphragm 20 and the peripheral electrode 32. This difference of the values of the electrostatic capacitance is measured, thereby an error based on a change in temperature or the like is corrected and noise or the like is removed in order to detect the pressure with precision.

Incidentally, the pressure sensor 10 is a gage pressure (a pressure differential from the atmospheric pressure of zero) sensor, in which the space between the diaphragm 20 and the upper glass 30 is opened for air through the through-holes 36 and 37 of the central electrode 31 and the peripheral electrode 32.

Procedure of fabrication

Procedure for fabricating the pressure sensor 10 will be described below.

Figure 5:
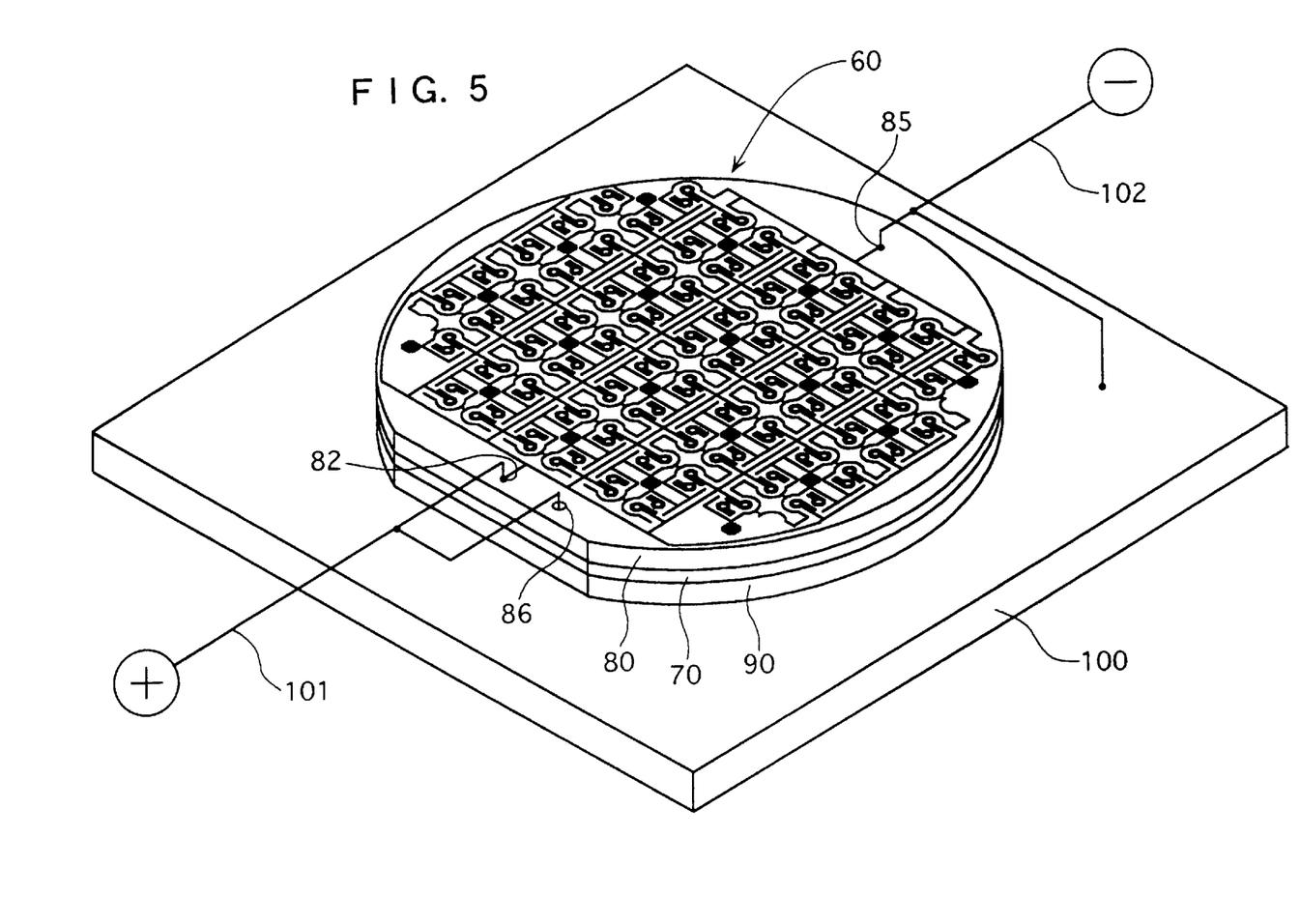
FIG. 5 is a perspective view for explaining a producing method of a pressure sensor according to the embodiment.
Figure 6:
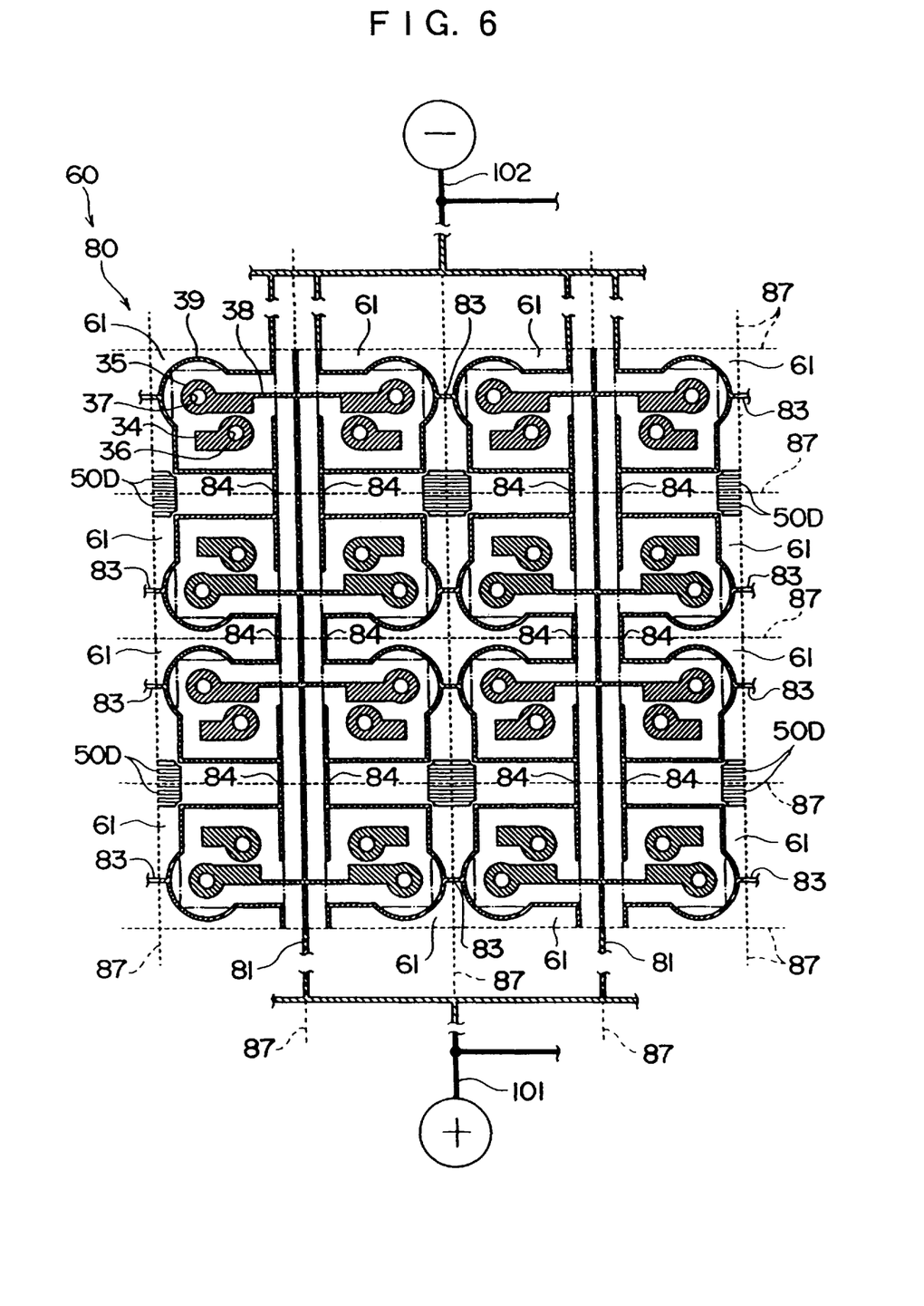
FIG. 6 is fragmentarily enlarged view of FIG. 5.

The pressure sensor 10 is fabricated in the following steps. As shown in FIG. 5 and FIG. 6, a laminated wafer 60 is formed by connecting a silicon wafer 70 as the diaphragm wafer (the movable electrode wafer) and top and lower glass wafers 80 and 90 as the substrate wafers by means of anodic bonding. United sensor chips 61 formed on the laminated wafer 60 (an independent sensor chip) are cut into individually along a cutting line 87 indicated with a dotted line in FIG. 6. And then the signal receiving portion 50 for the diaphragm 20 is formed on the cut sensor chip 61 (see FIG. 2 and FIG. 4).

More specifically, the silicon wafer 70 is formed to have the plural combined diaphragms 20 by etching or another way. The lower glass wafer 90 is formed therein with the plural pressure guiding ports 41 as the plural lower glasses 40 are combined. The silicon wafer 70 and the lower glass wafer 90 are cleaned before anodic bonding.

Similarly, the upper glass wafer 80 as the substrate wafer is formed thereon with the through-holes 36 and 37, the central electrodes 31, the peripheral electrodes 32, the signal receiving portions 34 and 35, the leading portions 38, the anodic bonding electrodes 39 and the patterns 50D for forming the signal receiving portions 50 by metal evaporation, using aluminum or the like, and etching. The upper glass wafer 80 is formed to have the plural combined upper glasses 30.

When the wafers 70, 80 and 90 are laminated, each diaphragm 20 of the silicon wafer 70, each upper glass 30 of the upper glass wafer 80 and each lower glass 40 of the lower glass wafer 90 lie on a position harmonized with one another so as to form the sensor chip 61 of the pressure sensor 10.

After that, the insulation film consisting of silicon dioxide ($SiO_2$) is formed on the approximately whole surface of the upper glass wafer 80 which is to be the detecting face 30A (on the surface that the central electrode 31 and the peripheral electrode 32 are formed) by means of a plasma CVD. Thereby forming the insulation film 11 on the approximately whole surface of each detecting face 30A of the upper glasses 30.

A series of conducting portions 81 connected to each of the leading portions 38 is formed on the cutting line 87 of the upper glass wafer 80 and extended to a connecting portion 82 (see FIG. 5). Junctions 83 and 84 are formed to connect to the anodic bonding electrodes 39 all together in an area divided by the conducting portions 81 so as to conduct all the anodic bonding electrodes 39 to a connecting portion 85 (see FIG. 5).

As shown in FIG. 5, after the lower glass wafer 90, the silicon wafer 70 and the upper glass wafer 80 are laminated in order on a setting board for the anodic bonding 100, having conductivity, a conductor wire 101 is connected to the connecting portion 82 and the silicon wafer 70 exposed in an opening hole 86 of the upper glass wafer 80. And a conductor wire 102 is connected to another connecting portion 85 and the setting board 100. The wafers 70, 80 and 90 undergo the anodic bonding by applying a voltage of approximately 400 V under high temperatures of approximately 400° C. between the conductor wires 101 and 102 to produce a current plus at the conductor wire 101 and a current minus at the conductor wire 102. At this time, the silicon wafer 70 are connected to the insulation film 11, formed on the upper glass wafer 80. Consequently, silicone wafer 70 and upper glass wafer 80 are connected to each other by means of the anodic bonding.

As described thus far, the plural sensor chips 61 divided by the cutting lines 87 are formed in the laminated wafer 60. Each of the sensor chips 61 are taken out by cutting the laminated wafer 60 along the cutting lines 87.

Next, the signal receiving portion 50 for the diaphragm 20 is formed to the sensor chip 61 with the following steps.

Figure 7:
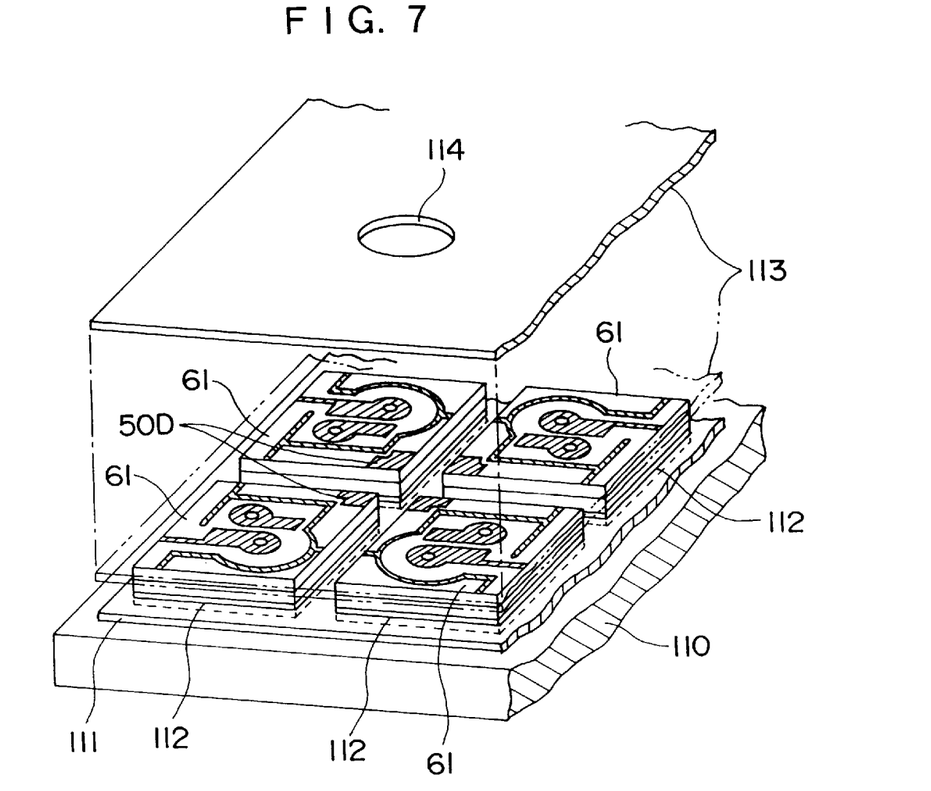
FIG. 7 is another perspective view for explaining the producing method of the pressure sensor.
Figure 8:
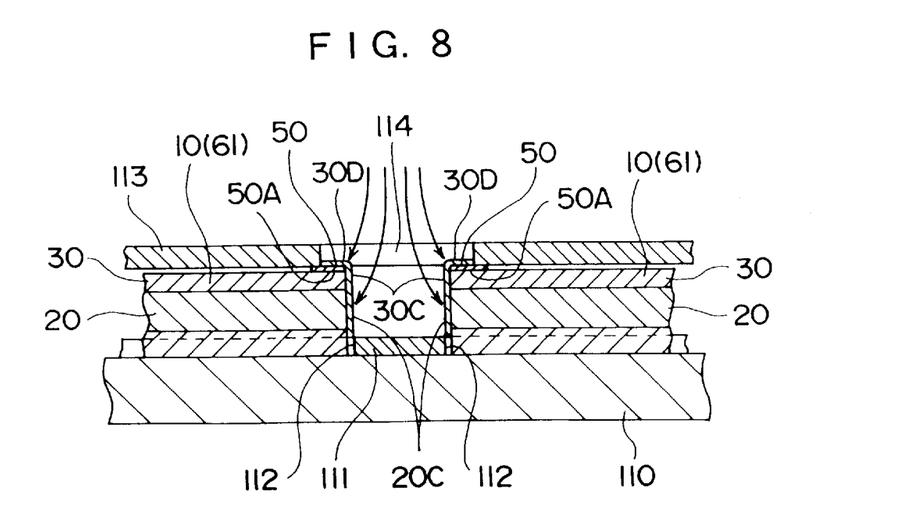
FIG. 8 is a sectional view for explaining the producing method of the pressure sensor.

As shown in FIG. 7 and FIG. 8, a holding jig 111 having plural chip holders 112 is placed on a setting board for evaporation 110. The chip holder 112 has an opening of the same size as the flat shape of the sensor chip 61, in which the chip holder 112 holds the sensor chip 61. Hence the sensor chips 61 are arranged at predetermined intervals.

After holding the sensor chips 61, while the side face 20C of the diaphragm 20 and the side face 30C of the upper glass 30 of the sensor chip 61 are exposed from the holding jig 111, a cover 113 having a circular hole 114 as a cut-out portion is laid over the four sensor chips 61 mutually adjoining. At this time the circular bole 114 is positioned above the corners 30D of the sensor chips 61 mutually adjoining, namely, above the patterns 50D. After that, the evaporation material having conductivity, such as metal, is evaporated and supplied toward the circular hole 114 (see the arrows in FIG. 8). Thereby, the signal receiving portion 50 is formed to spread across the side face 20C of the diaphragm 20, the side face 30C of the upper glass 30 and the pattern 50D previously formed on the upper face 30B, resulting in the finished pressure sensor 10.

Effects

According to the embodiment, the following effects are listed.

The insulation film 11 is formed on the face of the upper glass wafer 80 that is to be the detecting face 30A, so that the clean face caused by the insulation film 11 can be formed on the approximately whole face of the upper glass wafer 80 which contacts the silicon wafer 70, namely, on the approximately whole face of each detecting face 30A of the upper glasses 30. After that, the silicon wafer 70 and the upper glass wafer 80 are mutually connected through the insulation film 11 by means of anodic bonding, so that the decrease of the connecting strength, which is created by contaminants in the upper glass wafer 80, can be avoided, thus ensuring the sufficient connecting strength between the upper glass 30 and the diaphragm 20 and enhancing the yield rate.

Since the insulation film 11 is formed by a plasma CVD, the upper glass wafer 80 is heated and the surface of the upper glass wafer 80 (the detecting face 30A of the upper glass 30) is bombarded by electron or ion when the insulation film 11 is formed. This action cleans the face of the upper glass wafer 80 which is to be the detecting faces 30A. And, the contactual strength of the insulation film 11 to the upper glass wafer 80 can be improved and the stable film quality can be obtained, so that ions can smoothly carry out the diffusional movement in the anodic bonding and the bond between the upper glass wafer 80 and the silicon wafer 70 is enhanced, resulting in avoidance of the decrease of yield rate which is caused by an inferior connection.

The insulation film 11 is formed on the approximately whole surface, including the central electrodes 31 and the peripheral electrodes 32, of the upper glass wafer 80 that is to be the detecting faces 30, so that the insulation film 11 is not needed to be carried out the partial patterning, thereby simplifying the processes for forming the film and allowing the easy fabrication.

Since the surface of the upper glass wafer 80, which is to be the detecting faces 30 including the central electrodes 31 and the peripheral electrodes 32, is coated with the insulation film 11, the sufficient insulating properties can be obtained between the central electrode 31, the peripheral electrode 32 and the diaphragm 20. Thereby ensuring the stable and accurate output even in high humidities and improving the accurate measurement.

The central electrode 31 and the peripheral electrode 32 are coated with the insulation film 11, thus enhancing corrosion resistance of the central electrode 31 and the peripheral electrode 32. Thereby the spaced range between the electrodes 31 and 32 and the diaphragm 20 can be maintained in the normal state and the high accuracy for detecting can be obtained.

The silicon wafer 70 consisting of silicon elements can be easily and sufficiently cleaned, therefore the upper face 21A and the lower face 21B of the thicker portion 21 of the diaphragm 20, as the connected faces to the top and lower glasses 30 and 40, can be also easily cleaned, resulting in the further improved connecting strength. The connected face to the diaphragm 20 is easily cleaned by reason of the lower glass 40 consisting of pure glass material, hence the sufficient connecting strength between the diaphragm 20 and the lower glass 40.

Of the signal receiving portions 34 and 35 respectively conducting to the central electrode 31 and the peripheral electrode 32, only the signal receiving portion 35 of the peripheral electrode 32 has the leading portion 38. For this reason, the length of the discontinuous portion 39A of the anodic bonding electrode 39 can be defined as a length allowing the one leading portion 38 to pass, in which the length may be short even in consideration for maintaining the withstand voltage sufficiently. As a result, the connecting strength between the diaphragm 20 and the upper glass 30 in the anodic bonding can be increased even when the plural fixed electrodes 31 and 32 are formed on the upper glass 30.

The leading portion 38 is conducted to the peripheral electrode 32 surrounding the central electrode 31, and the same voltage as the diaphragm 20 is applied to the leading portion 38 during anodic bonding. Consequently, electric potentials of the peripheral electrode 32 and the central electrode 31 surrounded by the peripheral electrode 32 are approximately equalized to that of the diaphragm 20, thereby avoiding the diaphragm 20 to be drawn toward the upper glass 30 during anodic bonding.

The leading portion 38 is formed to only the signal receiving portion 35 of the peripheral electrode 32, whereas the signal receiving portion 34 of the central electrode 31 does not have a leading portion. Hence, the two leading portions do never approach each other in the discontinuous portion 39A of the anodic bonding electrode 39 as seen in prior art FIG. 9, with the result that decrease of insulation resistance between the electrodes 31 and 32 can be avoided.

Concerning the laminated wafer 60, the leading portions 38 are conducted to one another through the conducting portions 81. Therefore, in order to equalize electric potentials of the electrodes 31 and 32 of the upper glass 30 to that of the diaphragm 20 when the anodic bonding is carried out, for example, the conducting portions 81 are drawn out to the connecting portion 82 and a voltage is applied to only the connecting portion 82. Thus easily carrying out the anodic bonding with simple facilities.

Each of the conducting portions 81 are formed on the cutting line 87, so that unwanted conductor does not remain on the pressure sensor 10 after the cutting process. Therefore, it is properly avoided to establish a short circuit in the mutual conductor wires through the unwanted conductor when the signal receiving portions 34 and 35 undergo bonding.

The signal receiving portion 50 for the diaphragm 20, which is drawn out from the diaphragm 20 through the side faces 20C and 30C, is formed on the corner 30D of the upper glass 30 as the insulator, so that it is unnecessary that the signal receiving portion is formed by cutting away the corner 30D of the upper glass 30. For this reason, the signal receiving portion 50 of the diaphragm 20 can be easily formed even in the miniaturization of the pressure sensor 10, resulting in the further improvement of miniaturization of the pressure sensor.

In the process for forming the signal receiving portion 50, the signal receiving portions 50 are concurrently formed onto the plural sensor chips 61 by using the holding jig 111 and the cover 113, resulting in the efficient fabrication of the pressure sensor 10.

The holding jig 111 and the cover 113 have simple structures with only the chip holder 112 and the circular hole 114, which leads the easy production and low production costs.

Resultingly, the production costs of the pressure sensor 10 can be reduced.

The pattern 50D is formed on the corner 30D of the upper glass 30 in the step of the sensor chip 61. Therefore, in the process for forming the signal receiving portion 50 by evaporation of metal or the like, the stable-shaped and positioned signal receiving portion 50 can be obtained in so far as the evaporation metal is deposited on a part of the pattern 50D in the upper glass 30, without recourse to the exact position of the circular hole 114 of the cover 113 to the sensor chip 61.

And further, when each of the sensor chips 61 is held in the holding jig 111, the corners 3D of the sensor chips 61 held can be proximate to one another by using the pattern 50D as a mark, thereby preventing the sensor chip 61 from placing in the wrong orientation.

Modification

It is to be understood that the present invention is not intended to be limited to the above-described embodiments, and it will be recognized that another structure or modifications lie within the scope of the present invention insofar as the purposes of the present invention are attained. The following modifications and the like are also included in the scope of the present invention.

In the aforementioned embodiment, the insulation film 11 is formed by means of evaporation, but a method for forming the film is not limited to evaporation. For example, the film can be formed by a thermal CVD, a light CVD, other CVDs, or sputtering. The film can be also formed by using the spin-coat.

The central electrode 31 and the peripheral electrode 32 are formed on only the upper glass 30 in the aforementioned embodiment, but the present invention can be applied to a pressure sensor which the fixed electrodes are similarly formed on the lower glass 40. In this case, the insulation film is formed on the detecting face of the lower glass 40, opposing the diaphragm 20 (on the face on which the fixed electrodes are formed). The diaphragm 20 and the lower glass 40 are mutually connected through the insulation film by means of the anodic bonding.

Figure 10:
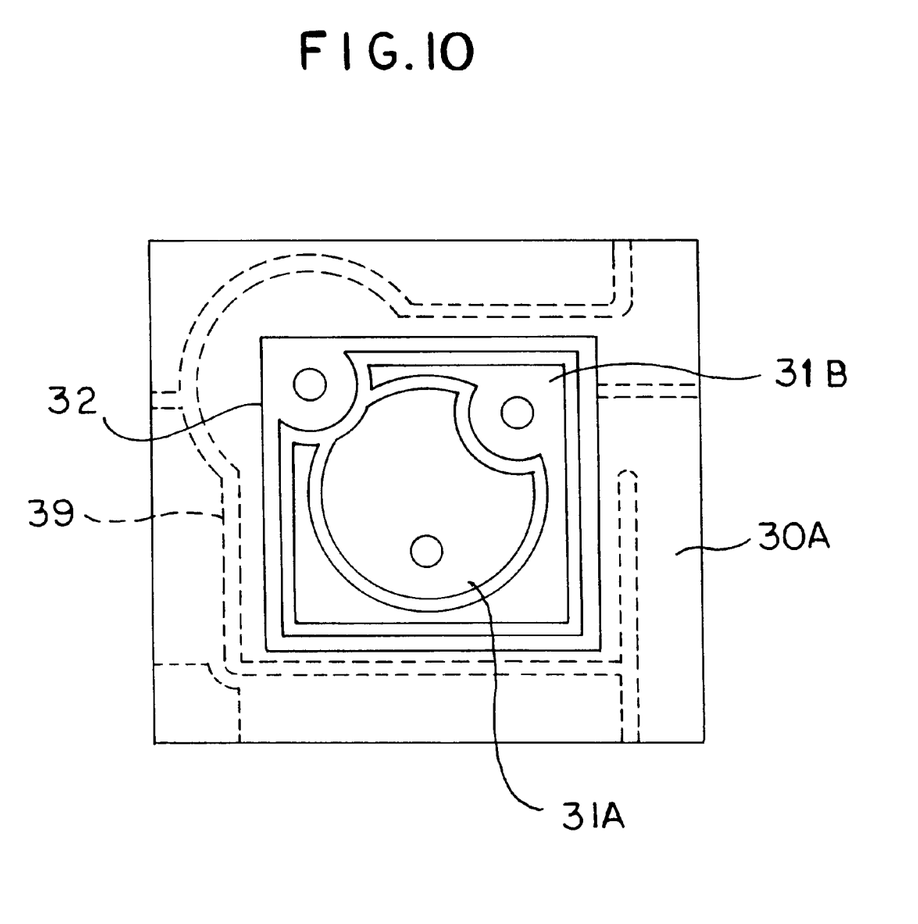
FIG. 10 is a back view of an alternative substrate in the absence of an insulation film.

The electrode formed on the substrate is not limited to two electrodes of the central electrode 31 and the peripheral electrode 32 in the aforementioned embodiment. Plural electrodes 31A and 31B corresponding to the central electrode or plural electrodes as seen by FIG. 10 corresponding to the peripheral electrode can be formed. In this case, only one electrode surrounding other electrodes has the leading portion, and the above electrode is applied with the same voltage as the diaphragm has.

In the aforementioned embodiment, the diaphragm 20 itself is the movable electrode. For example, where the diaphragm consists of insulator, the movable electrode may be formed by forming a conductive thin film on the diaphragm based on the technology of the semiconductor process.

The thicker portion 21 is combinedly formed along the margins of the diaphragm 20 in the aforementioned embodiment. But the thicker portion may be combinedly formed on the substrate by forming a recess portion on the substrate such as a glass. Here, the diaphragm may have a uniform thickness. As another manner, it can be considered that the thicker portion is independently formed and placed between the diaphragm and the substrate.

The signal receiving portion 50 for the diaphragm 20 is extended to the upper face 30B of the upper glass 30 in the aforementioned embodiment, but the signal receiving portion 50 may be extended to only the side face 30C of the upper glass 30, for example. Depending upon usage patterns of the pressure sensor, it may be decided whether the signal receiving portion is extended to the upper face 30B or not.

The signal receiving portion 50 is formed by evaporation in the embodiment, but can be formed by sputtering.

In the aforementioned embodiment, each of the leading portions 38 is conducted through the conducting portion 81 in the laminated wafer 60, but the present invention includes the case that the conducting portion 81 is not formed as disclosed in the U.S. Pat. No. 4,384,899. It is desirable that the conducting portion is formed as described in the embodiment from the point of view on the aforementioned effects.

The pressure sensor 10 can be fabricated by connecting the upper glass 30, the diaphragm 20 and the lower glass 40, which are formed independent from one another, by means of the anodic bonding.

The electrostatic capacitance type transducer is not limited to apply to the pressure sensor 10 for measuring pressure, described in the embodiment, and it can be used for various measuring instruments for measuring other state quantities, such as an acceleration sensor in which the movable electrode has a weight. In other words, insofar as the electrostatic capacitance type transducer has the substrate, the movable electrode which is formed on the opposite side of a space from the substrate and has displacement in relation to the substrate, and the fixed electrode formed on the detecting face of the substrate which is opposite the movable electrode, in which the substrate and the movable electrode are connected to each other by means of the anodic bonding, the usage manners and the like are freely selected.

Specific Experiments

Experiment 1

In the embodiment, the pressure sensor 10 is produced in conditions that materials of the central electrode 31 and the peripheral electrode 32 are aluminum.

Comparison 1

In the embodiment, the pressure sensor 10 is produced in conditions that materials of the central electrode 31 and the peripheral electrode 32 are aluminum, and the insulation film 11 is not formed on the upper glass 30.

Comparison 2

In the embodiment, the pressure sensor 10 is produced in conditions that materials of the central electrode 31 and the peripheral electrode 32 are aluminum, and the insulation film 11 is not formed on the upper glass 30 but is formed on the opposite face 20A of the diaphragm 20, facing toward the upper glass 30.

Procedure of Experiments

The pressure sensors 10 which are produced in Experiment 1, Comparison 1 and Comparison 2 are compared as to a corrosive state after being submerged in pure water for 47 hours.

Results of Experiments

The electrodes 31 and 32 of the pressure sensor 10 according to Experiment 1 do not corrode, whereas the electrodes 31 and 32 of the pressure sensor 10 according to Comparisons 1 and 2 corrode so vigorously as to have discoloration and the uneven surface. It is understood from the above results that corrosion resistance can be improved by forming the insulation film 11.

The contact yield rate of Comparison 1 is lower as compared with that of Experiment 1. Therefore, it is understood that the contact yield rate can be enhanced by forming the insulation film 11 on the upper glass 30.

The contact yield rate of Comparison 2 is conspicuously lower as compared with that of Experiment 1. It is verified from the results that the contact yield rate can be improved by forming the insulation film 11 on the upper glass 30 (the detecting face 30A facing the diaphragm 20) and by not forming it on the diaphragm 20 (the opposite face 20A facing the upper glass 30).

What is claimed is:

1. An electrostatic capacitance type transducer comprising:
    a non-conductive substrate having a detecting face;
    a fixed electrode formed on said detecting face;
    an insulating film disposed over said detecting face of said substrate, wherein said insulating film covers said fixed electrode and has a thickness between 100 Å and 10,000 Å;
    a movable electrode mounted over said detecting face of said substrate, wherein said movable electrode forms a diaphragm that extends over and is spaced from said fixed electrode wherein, said movable electrode is anode bonded to said insulating film so that said substrate and said movable electrode are anode-bonded together.

2. The electrostatic capacitance type transducer according to claim 1, wherein said insulating film comprises silicon dioxide ($SiO_2$) as the main component.

3. The electrostatic capacitance type transducer of claim 2, wherein the movable electrode has a conductive signal receiving portion that extends from a side face of the substrate to the movable electrode.

4. The electrostatic capacitance type transducer according to claim 1, wherein:
    at least two fixed electrodes are formed on said detecting face of said substrate and at least at first one of said fixed electrodes is formed to surround a second one of said fixed electrodes;
    said substrate has an upper face opposite said detecting face, conductive signal receiving portions are formed on said upper face, each said signal receiving portion being connected to one of said fixed electrodes, and an anodic bonding electrode is formed on said upper face, said anodic bonding electrode being formed to define a gap; and
    one of said signal receiving portions that is connected to either said first or said second fixed electrode has a leading portion that extends through the gap defined by said anodic bonding electrode.

5. The electrostatic capacitance type transducer according to claim 4, wherein said first fixed electrode includes plural electrode elements including an outer electrode element that surrounds both the remaining electrode elements forming said first fixed electrode and said second fixed electrode, wherein one of said electrode elements of said first fixed electrode is provided with said leading portion that extends through the gap defined by said anodic bonding electrode.

6. The electrostatic capacitance type transducer according to claim 5, wherein said outermost electrode element of said first fixed electrode is the electrode element provided with said leading portion that extends through the gap defined by said anodic bonding electrode.

7. The electrostatic capacitance type transducer according to claim 4, wherein a side face of said substrate is formed with a signal receiving portion that is connected to said movable electrode.

8. The electrostatic capacitance type transducer of claim 4, wherein either said first or said second fixed electrode has plural electrode elements.

9. The electrostatic capacitance type transducer of claim 1, wherein the movable electrode has a conductive signal receiving portion that extends from a side face of the substrate to the movable electrode.

* * * * *

UNITED STATES PATENT AND TRADEMARK OFFICE
CERTIFICATE OF CORRECTION

PATENT NO. : 5,917,264
DATED : June 29, 1999
INVENTOR(S) : Naohiko MARUNO et al

It is certified that error appears in the above-identified patent and that said Letters Patent is hereby corrected as shown below:

On the title page, column 1, after the title insert:
---[73] Nagano Keiki Co., Ltd.---.
 and at line 4; change "[76]" to ---[75]---.

Signed and Sealed this

Sixteenth Day of May, 2000

Attest:

Q. TODD DICKINSON

Attesting Officer

Director of Patents and Trademarks